United States Patent [19]

Ward

[11] Patent Number: 4,461,947
[45] Date of Patent: Jul. 24, 1984

[54] ROTATING LASER BEAM WITH COINCIDENT GAS JET

[75] Inventor: Kenneth R. Ward, San Jose, Calif.

[73] Assignee: Allied Corporation, Morris Township, Morris County, N.J.

[21] Appl. No.: 411,060

[22] Filed: Aug. 24, 1982

[51] Int. Cl.³ .............................................. B23K 27/00
[52] U.S. Cl. ..................... 219/121 FS; 219/121 LC; 219/121 LG; 219/121 LU
[58] Field of Search .................. 214/121 FS, 121 LC, 214/121 LD, 121 LG, 121 LN, 121 LH, 121 LJ, 121 LK, 121 LL, 121 LP, 121 LR, 121 LU, 121 LV, 121 LX

[56] References Cited

U.S. PATENT DOCUMENTS

| | | |
|---|---|---|
| 3,597,578 | 8/1971 | Sullivan et al. .......... 219/121 LN X |
| 3,619,550 | 11/1971 | Matthews ................ 219/121 LU X |
| 3,685,882 | 8/1972 | Van Der Jagt ........... 219/121 FS X |
| 4,031,351 | 6/1977 | Martin ...................... 219/121 FS X |
| 4,367,017 | 1/1983 | Jimbou et al. ........... 219/121 LV X |

Primary Examiner—C. L. Albritton
Attorney, Agent, or Firm—James Riesenfeld; Gerhard H. Fuchs

[57] ABSTRACT

An apparatus provides to a surface a laser beam and gas stream that impinge and rotate in coincidence. The apparatus comprises an optical system (11) to direct the laser beam to a spot in a plane and a stationary gas plenum (16) through which gas passes en route to an outlet nozzle (18) that directs the gas stream to the same spot. The optical system and nozzle rotate in synchronism to cause the spot to trace a circle. The apparatus finds application in materials processing, such as welding and cutting (trepanning).

5 Claims, 6 Drawing Figures

ROTATING LASER BEAM WITH COINCIDENT GAS JET

BACKGROUND OF THE INVENTION

1. Field of the Invention

This invention relates to an apparatus for providing a coincident rotating laser beam and gas jet.

2. Description of the Prior Art

Among the many important applications of lasers are materials processing and machining, including welding, drilling, perforating, cutting, scoring, and marking. There are commercially available laser systems to perform all these operations on a variety of materials, such as plastics, ceramics, metals, etc. These systems typically comprise the following elements: a laser having the emission wavelength, power, and other parameters appropriate to the particular application and material; a beam delivery system to direct the laser beam to the workpiece; a workpiece handling system to hold and, optionally, move the workpiece; controls for the system's elements; and auxiliary equipment, which may be required for certain applications.

It is often desirable to move a laser beam in a circular pattern relative to a workpiece; for example, to cut round holes (trepan) or make perforations or welds in a circular pattern. To accomplish that, the beam delivery system may include a focusing lens that rotates in the plane of the lens on an axis that coincides with the laser beam. Alternatively, the beam may be rotated by a rotating mirror. Still another alternative is to move the workpiece, while either maintaining a stationary laser beam or coordinating the movement of the beam and workpiece. Moving the workpiece is inexpedient when the workpiece is massive and/or must be moved rapidly.

In certain materials-processing and machining applications, it is desirable to direct a gas stream to the spot on the workpiece where the laser beam impinges. Depending on the process, the gas may be an inert-, oxidizing-, or reactive-gas. Some applications require both that the laser beam move in a circular pattern and that a gas impinge on the same spot as the laser beam. The prior art apparatuses and methods that have been designed for those applications have several drawbacks. The apparatuses tend to be complex, expensive, and unreliable. Furthermore, they require alignment of the laser beam and gas nozzle—a tedious and time-consuming operation—each time either a lens or nozzle is replaced.

SUMMARY OF THE INVENTION

In accordance with the present invention, an apparatus for providing to a surface a rotating laser beam and coincident gas stream comprises optical means for deflecting an incident laser beam onto a spot in a plane normal to the incident beam, a stationary gas plenum in communication with means for conveying the gas through an outlet nozzle to the spot, and mounting means for rotatably holding the optical means and nozzle for synchronous motion that causes the spot to trace a circular arc in the plane. Compared with apparatus of the prior art the present apparatus provides the advantages of simple, reliable, and inexpensive construction. Alignment of the laser beam and gas nozzle may be automatically maintained; thus, realignment is not necessary when the lens or nozzle is replaced.

DETAILED DESCRIPTION OF THE INVENTION

Figure 1:
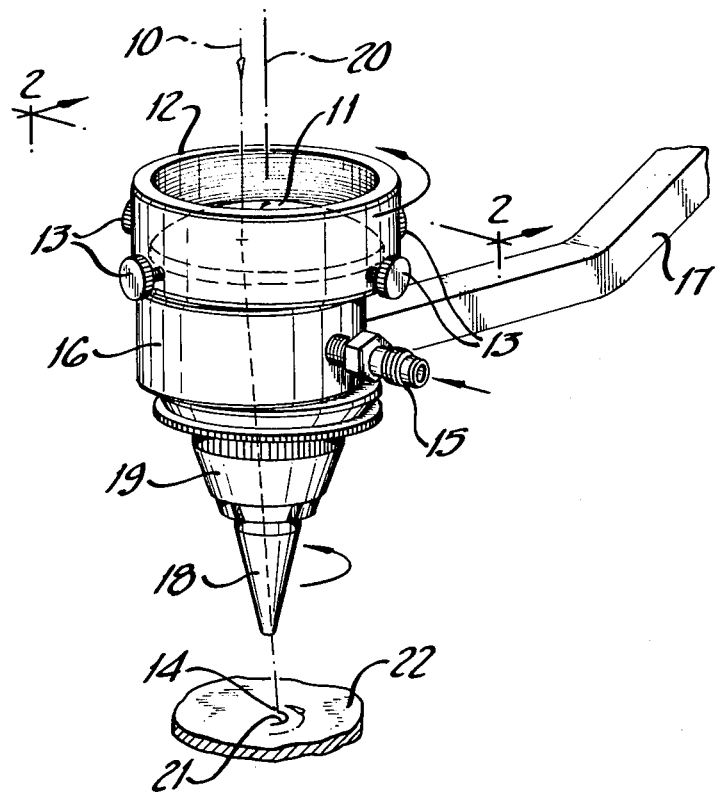
FIG. 1 is an isometric view of an apparatus of the present invention.

This invention provides an apparatus for materials-processing applications that require a focused laser beam spot to trace a circular path, while a high-velocity gas stream impinges on the spot. The applications include welding, brazing, trepanning, etc.

The elements of the apparatus are an optical system for directing a laser beam, a stationary gas plenum, a gas outlet nozzle, means for conveying a gas from the plenum to the outlet nozzle, and means for synchronously moving the laser beam and nozzle so that a laser beam and gas stream are coincident on a spot that traces a circle.

The laser beam is provided by any laser having parameters that are suitable for the process. As is well known in the art, lasers that have been used for materials processing include both pulsed and cw lasers; gas lasers, such as carbon dioxide; solid-state lasers, such as YAG and alexandrite; ion lasers, such as argon ion; and dye lasers. For welding and cutting of metals, YAG and alexandrite are particularly suitable.

The laser beam is deflected, or focused, by lenses and/or mirrors in a conventional optical system, of a type well known in the art. In a particularly simple, but suitable, embodiment, the optical system comprises a single converging lens.

A distinctive feature of the present apparatus is that it includes a stationary gas plenum, thus eliminating the need for the complex rotary seals that the prior art units require. A wide variety of gases are used in these applications and can be used in the present apparatus. For example, air or oxygen are commonly used for cutting, nitrogen or other inert gas for welding.

The gas outlet nozzle is of conventional construction and, for certain applications, may require sufficient mechanical strength to withstand high gas pressures and/or high temperatures. For example, in laser cutting applications, it is often necessary to provide a very high speed gas flow, close to sonic speeds. That dictates the use of high gas pressure and small (typically less than about 2 mm) nozzle diameter. The nozzle must also withstand the high temperatures that may be caused by its proximity to the workpiece. The beam and nozzle are moved synchronously, typically driven by a DC motor, which rotates the beam focusing means and nozzle about the axis of the incident laser beam at a rate of up to about 100 rpm or more. Since both the focusing and nozzle elements may be of low mass, high-speed rotation can be readily accomplished. As the focused spot moves, it traces a circle whose radius equals the distance from the optical axis of the focusing means to the beam axis, and the gas jet is always directed at that moving spot.

In a preferred embodiment of this invention, the optical axis of the beam-focusing means and the axis of symmetry of the nozzle are aligned and are parallel to the incident beam. The mounting that holds these elements rotates about the incident beam direction and is sealed against the gas plenum with pairs of O-rings. At each sealing surface, an O-ring of resilient material, preferably silicon rubber, contacts the gas plenum and a second O-ring of a low-friction material, preferably poly(tetrafluoroethylene), contacts the first O-ring and the rotating mount. This double O-ring sealing arrangement provides a good seal without requiring high tolerances on the positioning of the surfaces.

Preferably, the rotating mount is a tube having a cross section that may, but need not be, circular. Holes through the tube's walls are a convenient means for providing gas passage from the gas plenum through the inside of the rotating mount and thence to the outlet nozzle. Preferably, the outlet nozzle is collet-mounted into the base of the mount to provide simple replacement and reproducible positioning of the nozzle.

In the figures discussed below, the same reference number is used for an element in each figure in which it appears.

An embodiment of the present invention is depicted in FIG. 1. The incident beam of radiation 10 from a laser (not shown) is deflected by an optical system (depicted simply as a lens) 11 onto a spot 14. Lens 11 is supported by optical mount 12 and positioned by thumbscrews 13. Gas flows from inlet 15 into plenum 16, which is rigidly mounted on arm 17. Internal passages (shown in FIG. 2) convey the gas out through nozzle 18 onto spot 14. Internal structure (shown in FIG. 2) joins optical mount 12 to nozzle support 19 in such a way that optical mount 12 and nozzle 18 have a common center line 20, which is parallel to, but offset from, incident beam 10. For clarity, the size of the offset is greatly exaggerated. As optical mount 12 is rotated (by drive means shown in FIG. 2) about an axis coinciding with incident beam 10, the deflected beam and gas stream trace a circular arc 21 on a plane 22 (e.g., a workpiece surface) that is normal to incident beam 10.

Figure 2:
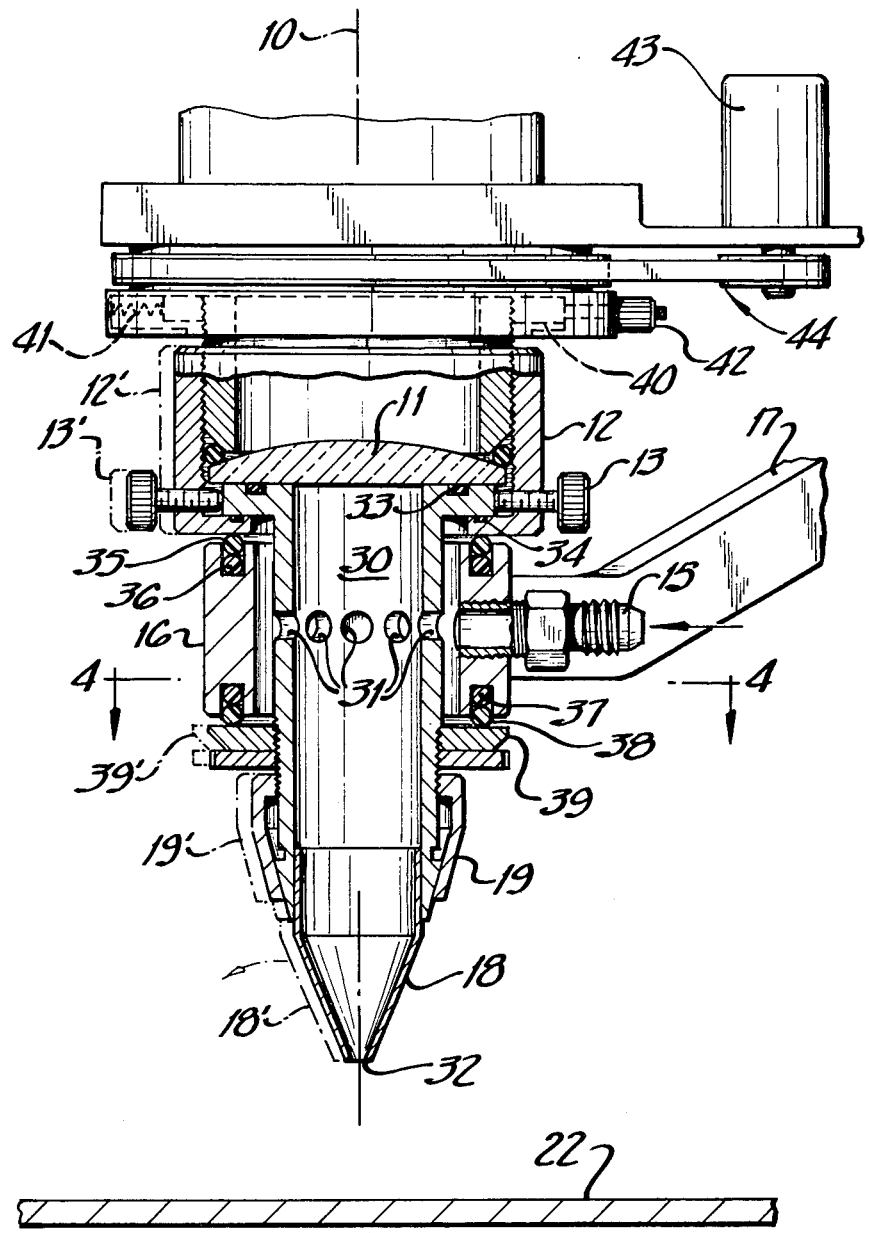
FIG. 2 is a side elevation view of a drive means and section taken along line 2—2 of FIG. 1.

Structural details can be understood by reference to the sectional elevation view shown in FIG. 2. Tubular mounting element 30 serves to join optical mount 12 to nozzle support 19. Through holes 31 in tubular element 30 provide a gas passage from plenum 16 to nozzle 18. If gas is to be expelled from nozzle 18 at a high velocity, then through holes 31 should be large and the opening 32 in nozzle 18 small. Of course, large through holes reduce the structural rigidity of tubular element 30; thus, the choice of optimum parameters involves a compromise.

By changing the position of tube 30 relative to optical mount 12, thumbscrews 13 change the relative position of lens 11 and nozzle 18. Optional O-rings 33 and 34 provide gas seals. O-rings 35 and 36 together with O-rings 37 and 38 provide seals between stationary gas plenum 16 and optical support 12 and disk surface 39, respectively. Materials for O-rings 35 and 38 are chosen for minimum friction, since they contact rotating elements 12 and 39, while O-rings 36 and 37 should be resilient.

Optical mount 12 is attached to base plate 40, which slides against spring plunger 41 under the action of micrometer adjust 42. The offset, precisely set by the micrometer, determines the radius of the circle traced on plane 22. Phantom lines 12', 13', 39', 19', and 18' show that these elements are translated left-and-right (and forward-and-back) relative to stationary gas plenum 16, as the mount is rotated about axis 10 by motor 43, acting through belt-and-pulley drive 44.

Figure 3:
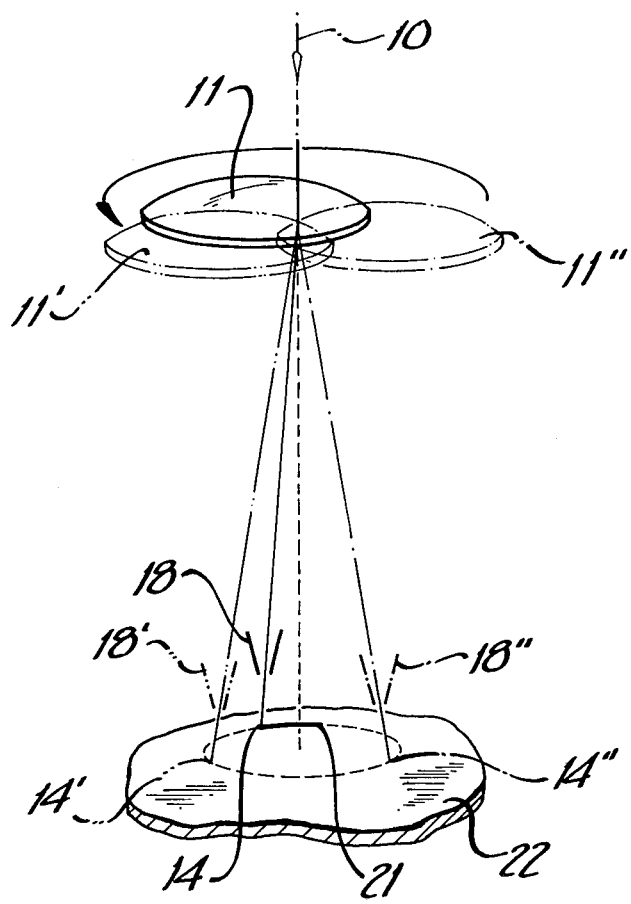
FIG. 3 is a schematic depicting the deflection of a laser beam by a rotating lens of the present invention.

FIG. 3 is a schematic that shows a lens 11 deflecting an incident beam 10 to a spot 14 on a plane 22. At a later time, the lens has moved to position 11', the spot to 14'. Still later, the lens 11" directs the beam to spot 14". During one rotation of lens 11, the spot 14 traces a circle on plane 22. Since the nozzle (18, 18', 18") rotates synchronously with the lens, at all times the deflected beam and the gas stream impinge on the same spot.

Figure 4:
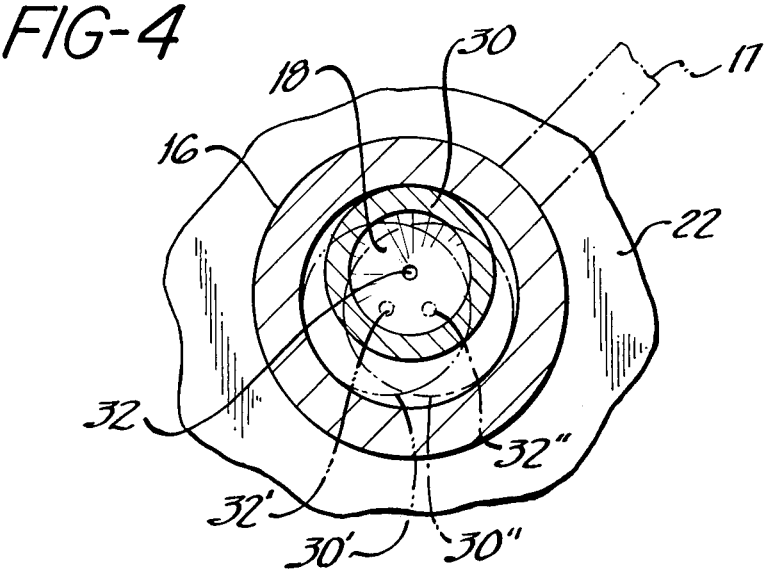
FIG. 4 is a section taken along line 4—4 of FIG. 2.

FIG. 4 is a sectional plan view showing the position of tubular mount 30 and nozzle openings 32 within gas plenum 16 at a particular time. At a later time, the mount and nozzle opening have moved to 30' and 32' and still later, to 30" and 32", respectively.

Figure 5:
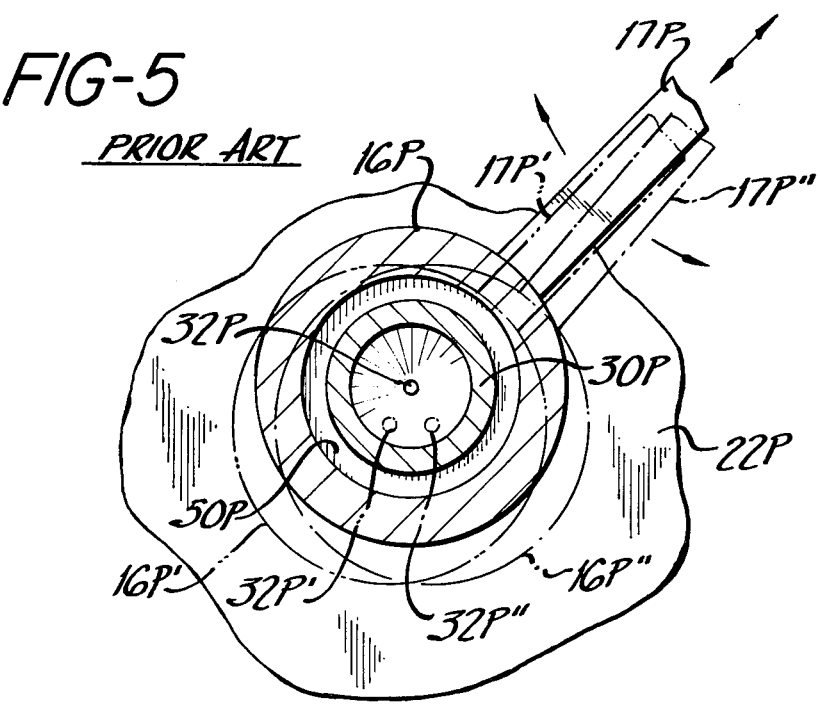
FIG. 5 is a sectional view showing a prior art apparatus.

FIG. 5 is a sectional plan view of a prior art apparatus in which the entire unit moves, including gas plenum 16P and mounting arm 17P. The gas plenum, held by radial bearing 50P, remains concentrically located around tubular mount 30P and nozzle opening 32P. As in FIGS. 3 and 4, primed and double-primed reference numbers identify successive positions of the elements. Rotary seals (not shown) are required for a gas seal between tubular mount 30P and gas plenum 16P.

Figure 6:
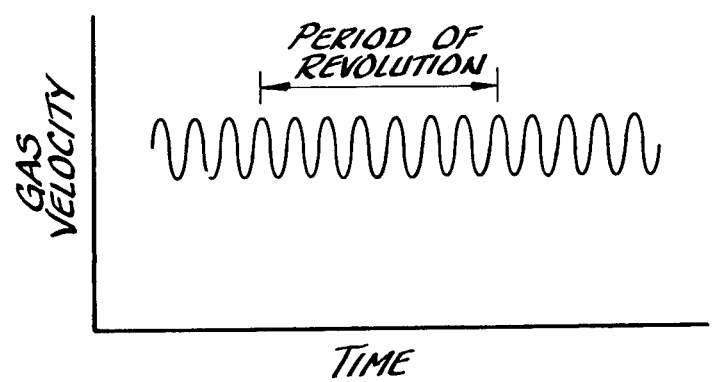
FIG. 6 is a graph of the time variation of gas flow from a nozzle of the present invention.

FIG. 6 is a graph of the variation with time of the gas stream from the nozzle. Peak gas flow results from alignment of a through hole 31 with gas inlet 15. If there is a substantial overpressure in plenum 16, then the falloff in gas flow when the inlet is not aligned with a through hole is acceptably small. The graph corresponds to an embodiment in which there are 8 through holes, thus 8 peaks per revolution.

I claim:

1. An apparatus for providing to a surface a rotating laser beam and coincident gas stream comprising:
   optical means (11) for deflecting an incident laser beam onto a spot in a plane normal to the incident beam,
   a stationary gas plenum (16) in communication with means for conveying the gas through an outlet nozzle (18) to the spot, and
   mounting means (12, 19, 30) for rotatably holding the optical means and nozzle for synchronous motion that causes the spot to trace a circular arc in the plane, and in which
   the optical means has an optical axis and the nozzle has an axis of symmetry;
   the mounting means
   (a) is rotatable about an axis that coincides with the incident beam and
   (b) holds the optical means and nozzle with their respective axes substantially aligned and substantially parallel to the incident beam; and
   a plurality of seals between the mounting means and the stationary gas plenum each comprise a first O-ring (35) of a low-friction material, in contact with the mounting means, and, in contact with the first O-ring, a second O-ring (36) of a resilient material in contact with the stationary gas plenum.

2. The apparatus of claim 1 in which the mounting means comprises a tube (30) having a plurality of holes (31) through which gas can flow.

3. The apparatus of claim 1 in which the first O-ring comprises poly(tetrafluoroethylene).

4. The apparatus of claim 1 in which the second O-ring comprises silicon rubber.

5. The apparatus of claim 1 in which the nozzle is adapted for collet mounting into the mounting means.

* * * * *